United States Patent
Li et al.

(10) Patent No.: US 8,317,409 B2
(45) Date of Patent: Nov. 27, 2012

(54) OPTICAL FIBER CONNECTOR AND OPTICAL FIBER CONNECTING DEVICE USING THE SAME

(75) Inventors: Zhi-Ming Li, Shenzhen (CN); Yan-Jiang Yang, Shenzhen (CN); Le-Peng Wei, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 132 days.

(21) Appl. No.: 12/965,846

(22) Filed: Dec. 11, 2010

(65) Prior Publication Data
US 2011/0158593 A1 Jun. 30, 2011

(30) Foreign Application Priority Data
Dec. 31, 2009 (CN) .......................... 2009 1 0312934

(51) Int. Cl.
*G02B 6/36* (2006.01)

(52) U.S. Cl. ................. 385/81; 385/53; 385/77; 385/92
(58) Field of Classification Search ...................... 385/53, 385/58, 76, 77, 81, 92
See application file for complete search history.

(56) References Cited

U.S. PATENT DOCUMENTS
2008/0226236 A1* 9/2008 Pepin et al. ...................... 385/81
2009/0285536 A1* 11/2009 Sakaki et al. ..................... 385/92
* cited by examiner

*Primary Examiner* — Brian M. Healy
*Assistant Examiner* — Mary El Shammaa
(74) *Attorney, Agent, or Firm* — Altis Law Group, Inc.

(57) ABSTRACT

An optical fiber connector includes a holder, a housing fixed on the holder, a clamping member for clamping an optical cable having an optical fiber, a protecting member positioned in the housing. The protecting member defines a bore for the optical fiber of the optical cable to moveably pass through. The optical fiber connector also includes a first elastic member, in which one end of the first elastic member resists the protecting member, and the other end of the first elastic member resists the clamping member, so as to extend the optical fiber out of the protecting member and the protecting member to partly protrude out of the housing.

12 Claims, 5 Drawing Sheets

OPTICAL FIBER CONNECTOR AND OPTICAL FIBER CONNECTING DEVICE USING THE SAME

BACKGROUND

1. Technical Field

The present disclosure relates generally to an optical fiber connector and optical fiber connecting device using the same.

2. Description of Related Art

A commonly used optical fiber connecting device includes two optical fiber connectors and a receptacle receiving the optical fiber connectors. The optical fiber connector includes a ferrule fixing an optical fiber in the center of the ferrule. The receptacle includes a sleeve therein for receiving the ferrules. When the two optical fiber connectors are received in the receptacle, the optical fibers in both ferrules of the optical fiber connectors contact each other to transmit a plurality of optical signals. The ferrules and the sleeve of the optical fiber connecting device are precisely formed of ceramic material to ensure coaxiality of the two ferrules and the sleeve, such that the optical fibers can be aligned with each other to optimize transmission of the optical signals. However, the optical fiber connecting device is costly due to requiring expensive material and the necessary precision.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
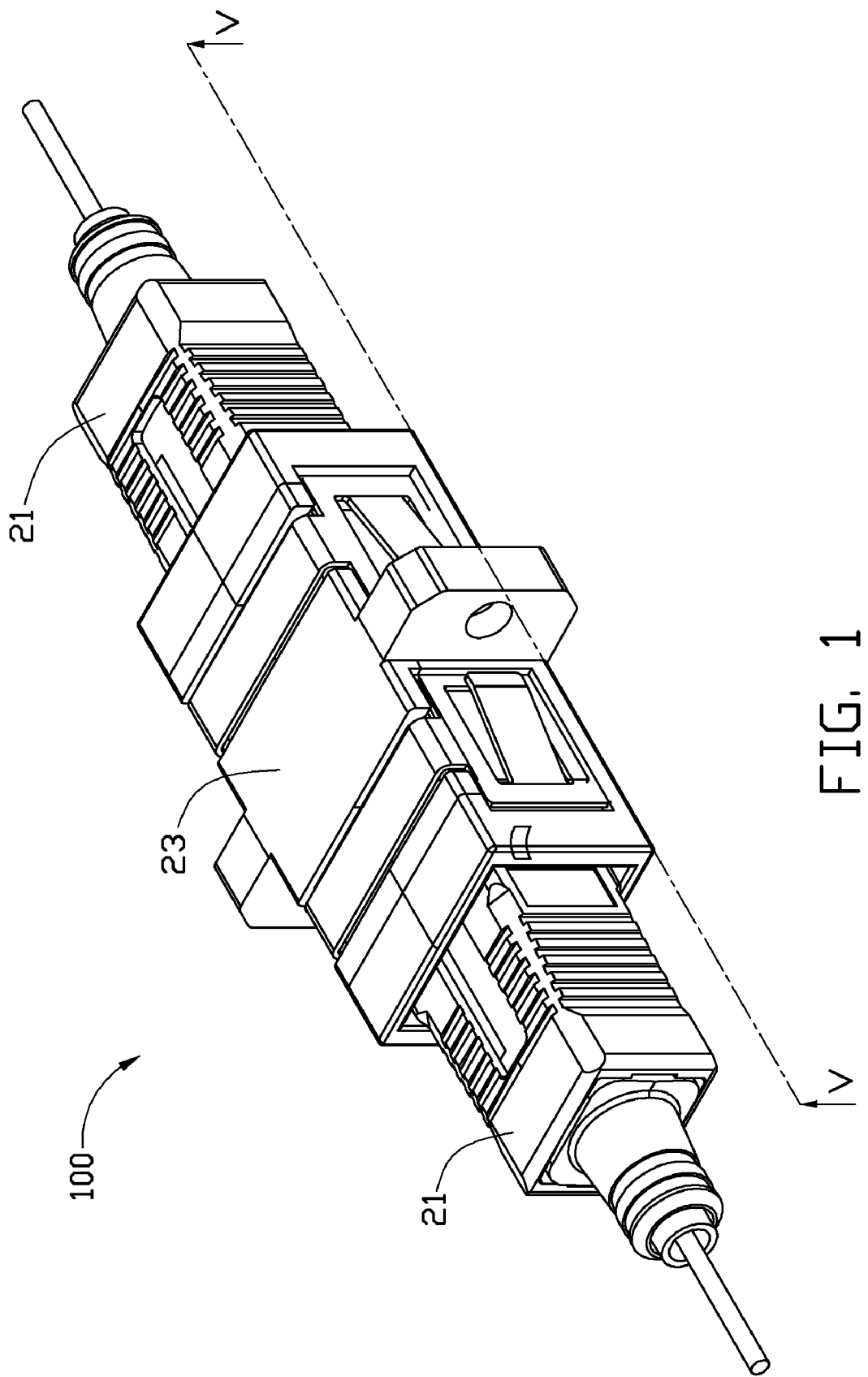
FIG. 1 is an isometric view of an embodiment of an optical fiber connecting device as disclosed, the optical fiber connecting device including two optical fiber connectors and a receptacle therefor.

Referring to FIGS. 1 through 4, an embodiment of an optical fiber connecting device 100 includes two optical fiber connectors 21 and a receptacle 23 receiving the two optical fiber connectors 21. The optical fiber connector 21 includes a housing 211, a socket 212, a protecting member 214, a first elastic member 215, a clamping member 216, a second elastic member 217, a hollow holder 218 and a tube 219. The optical fiber connector 21 acts also as a terminator for an optical cable 30 having an optical fiber 301 therein. In the illustrated embodiment, the first elastic member 215 and the second elastic member 217 are a plurality of coiled springs.

The housing 211 is rectangular, and includes two clamping sidewalls 2110 opposite to each other, a limiting end 2111, two support sidewalls 2112 opposite to each other, and a receiving end 2113 opposite to the limiting end 2111. Each support sidewall 2112 interconnects two clamping sidewalls 2110, respectively. The housing 211 forms a limiting flange 2114 adjacent to the limiting end 2111. The limiting flange 2114 defines a limiting hole 2115 therein. Each support sidewall 2112 defines a slot 2116 at the receiving end 2113, whereby the housing 211 can elastically open at the receiving end 2113 for partially receiving the holder 218. Each clamping sidewall 2110 defines a latching hole 2117 adjacent to the receiving end 2113, and forms a longitudinal latching protrusion 2118 adjacent to the limiting end 2111 and a positioning protrusion 2119 between the latching protrusion 2118 and the latching hole 2117. The latching protrusion 2118 is longer than the positioning protrusion 2119.

The socket 212 receives the housing 211. The socket 212 defines a T-shaped sliding hole 2121 at a sidewall thereof. Each sliding hole 2121 includes a first sliding portion 2123 receiving the latching protrusion 2118 and a second sliding portion 2125 receiving the positioning protrusion 2119.

The protecting member 214 is substantially cylindrical and includes a cylindrical main body 2140, a limiting portion 2141 formed at an end of the main body 2140, and a guiding portion 2143 formed on the other end of the main body 2140. A diameter of the guiding portion 2143 is slightly less than that of the main body 2140. The protecting member 214 defines a bore 2145 extending along the whole length of protecting member 214, through which the optical fiber 301 passes. In the illustrated embodiment, the protecting member 214 is made of plastic. Alternatively, the protecting member 214 may be made of metal.

The clamping member 216 includes a round base portion 2161 and a post 2163 formed on the base portion 2161. The clamping member 216 defines a bore 2165 extending through the base portion 2161 and the post 2163. The post 2163 forms a stopping flange 2166, and defines two fixing holes 2167 opposite to each other adjacent to the stopping flange 2166. The post 2163 forms two elastic resisting tabs 2168 thereon, corresponding to the two fixing holes 2167, respectively.

The holder 218 includes a reinforcement portion 2181, a latching portion 2182 formed at an end of the reinforcement portion 2181 and a cylindrical mounting portion 2183 at the other end of the reinforcement portion 2181. The latching portion 2182 forms two wedged contact protrusions 2184. A height of the contact protrusion 2184 decreases away from the reinforcement portion 2181. The latching portion 2182 forms two guide strips 2185 corresponding to the two slots 2116 of the housing 211. An end of the guide strip 2185 extends beyond the latching portion 2182. The mounting portion 2183 mounts a boot (not shown) thereon. The holder 218 defines a first receiving chamber 2187 receiving the base portion 2161 of the clamping member 216 and a second receiving chamber 2188 receiving the tube 219 and the post 2163 partly therein. The holder 218 forms a substantially circular shoulder 2186 at an inner surface thereof, and dividing the first receiving chamber 2187 and the second receiving chamber 2188.

The tube 219 is sleeved on the post 2163. Tube 219 is longer than post 2163. The tube 219 forms a circular stopping portion 2191 adjacent to an end thereof for holding the optical cable 30 and a clamping portion 2193 at the other end thereof.

In assembly, the optical fiber 301 of the optical cable 30 passes through the tube 219, the second receiving chamber 2188 of the holder 218, the first receiving chamber 2187 of the holder 218, the second elastic member 217 and the bore 2165 of the clamping member 216, and then protrudes out of the base portion 2161 of the clamping member 216. The post 2163 passes through the first receiving chamber 2187, and the shoulder 2186 is compressed by the stopping flange 2166, allowing the post 2163 to be received in the second receiving chamber 2188. An end of the second elastic member 217 resists the base portion 2161 of the clamping member 216, the other end of the second elastic member 217 resists the shoulder 2186 of the holder 218, and thus the stopping flange 2166 resists the shoulder 2186. The tube 219 is sleeved on the post 2163, compressing the two resisting tabs 2168 and holding the cable 30. The stopping portion 2191 of the tube 219 contacts an outer surface of the cable 30, thereby preventing contaminants from entering the cable 30. The optical fiber 301 passes through the first elastic member 215 and the protecting member 214 in that order, thus to dispose the optical fiber 301 in the bore 2145 of the protecting member 214. An end surface of the optical fiber 301 is substantially coplanar with an end surface of the limiting portion 2141 of the protecting member 214. The first elastic member 215 and the protecting member 214 are positioned in the housing 211. Each guide strip 2185 is received into the slot 2116 of the housing 211 correspondingly. Each contact protrusion 2184 of the holder 218 is latched into one latching hole 2117, to fix the holder 218 on the housing 211, such that the holder 218 and the housing 211 cooperatively receive the protecting member 214, the first elastic member 215, the clamping member 216 and the second elastic member 217. An end of the first elastic member 215 resists the base portion 2161 of the clamping member 216, and the other end of the first elastic member 215 resists the limiting portion 2141 of the protecting member 214, such that the guiding portion 2143 passes through the limiting hole 2115 of the housing 211. The limiting portion 2141 of the protecting member 214 resists the limiting flange 2114 of the housing 211, thereby preventing the protecting member 214 from detaching from the housing 211. The protecting member 214 is able to be received in the housing 211, compressing the first elastic member 215, to extend the optical fiber 301 out of the protecting member 214. The housing 211 is positioned in the socket 212. The latching protrusion 2118 is positioned in the first sliding portion 2123 of the sliding hole 2121, and the positioning portion 2119 is positioned in the second sliding portion 2125 of the sliding hole 2121, thus the socket 212 is capable of sliding on the housing 211, until the latching protrusion 2118 or the positioning protrusion 2119 is blocked by an inner surface of the sliding hole 2121.

Figure 2:
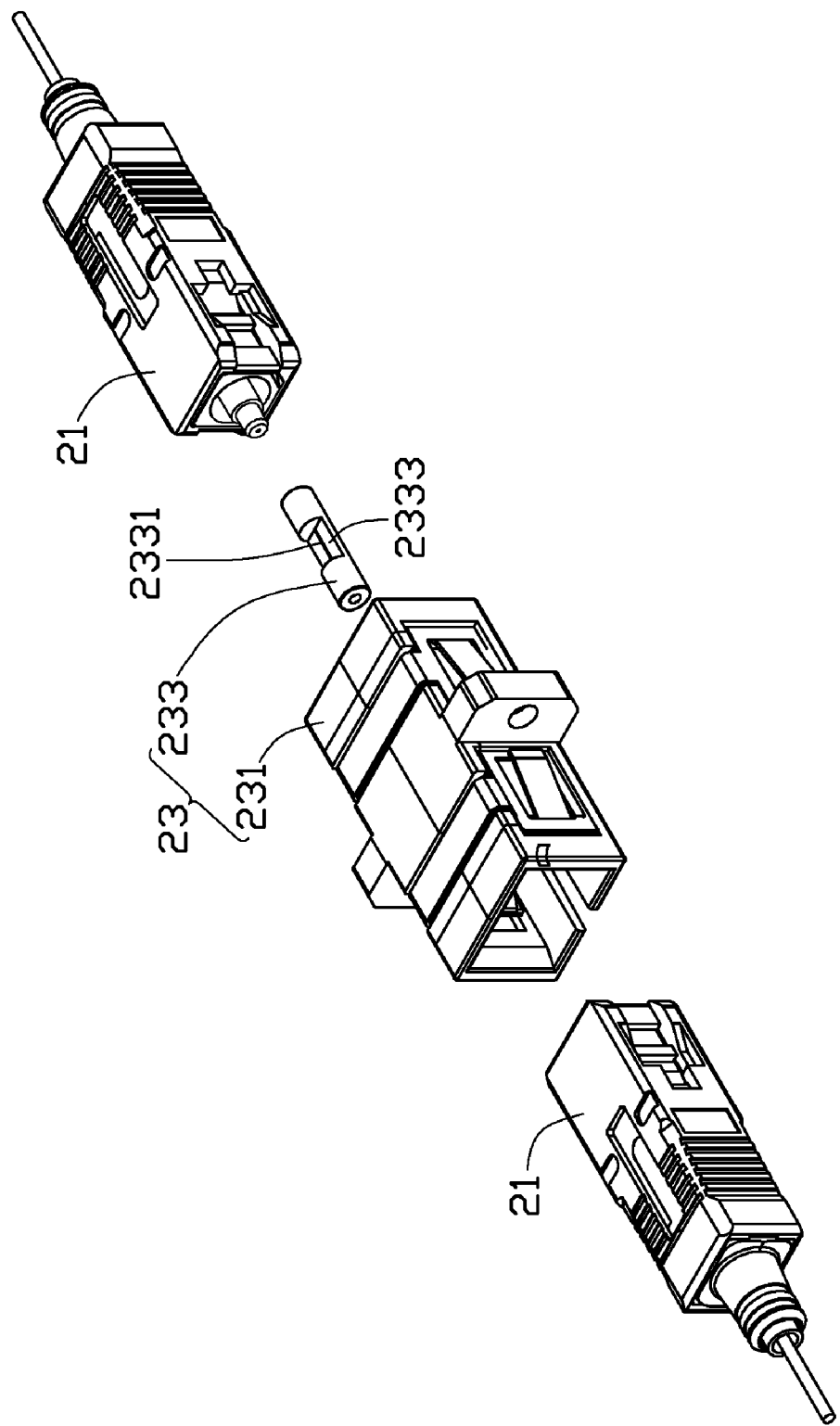
FIG. 2 is a partially exploded, isometric view of the optical fiber connecting device of FIG. 1.
Figure 3:
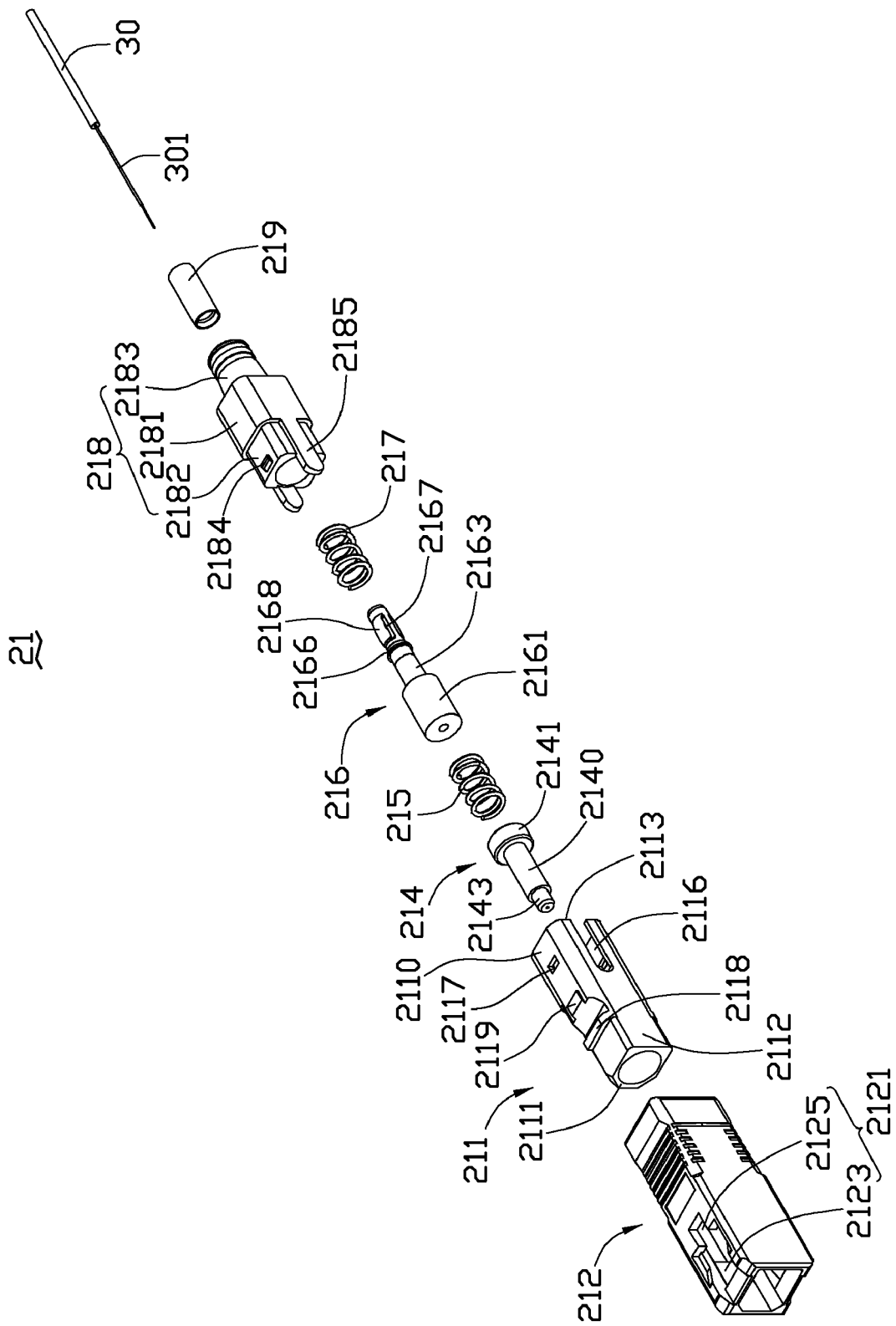
FIG. 3 is an exploded, isometric view of the optical fiber connector shown in FIG. 1.
Figure 4:
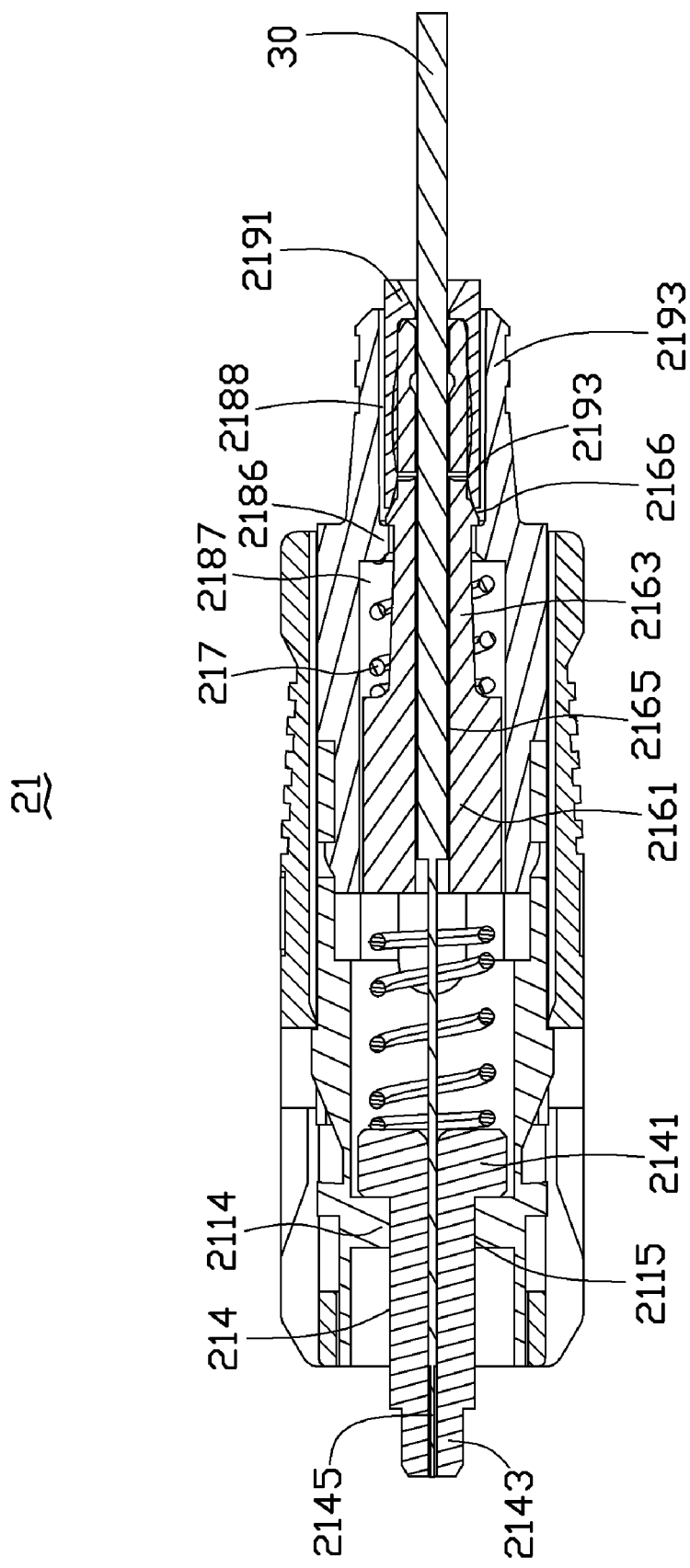
FIG. 4 is a cross-section of the optical fiber connector shown in FIG. 3.
Figure 5:
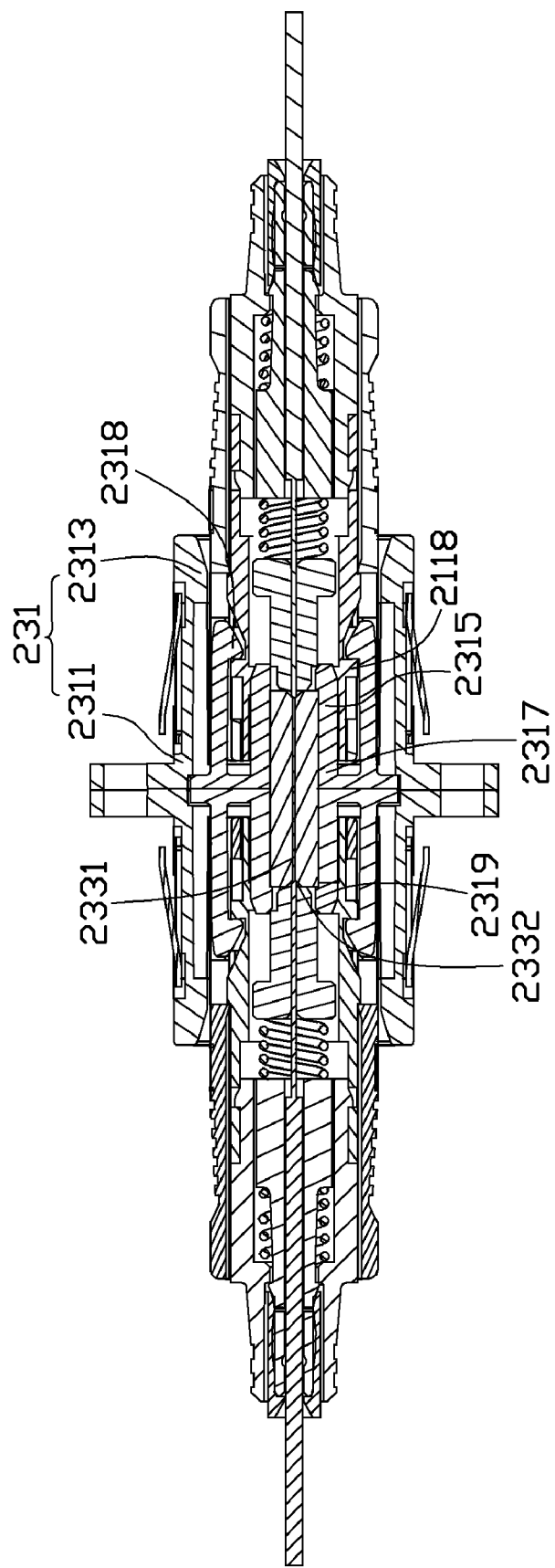
FIG. 5 is cross-section of the optical fiber connecting device of FIG. 1, taken along line V-V.

As shown in FIGS. 2 and 5, the receptacle 23 includes two receiving members 231 and a ferrule 233. The receiving member 231 includes a fixing end 2311, a received end 2313, a sleeve 2315 in the receiving member 231 receiving the ferrule 233, a fixing board 2317 fixing the sleeve 2315 in the receiving member 231 and a pair of elastic hooks 2318 at the sides of the sleeve 2315. The sleeve 2315 forms a fixing portion 2319 at each end thereof. The ferrule 233 defines a receiving hole 2331 therein for receiving the optical fiber 301. The ferrule 233 defines a funnel-shaped guiding slot 2332, and a diameter of the guiding slot 2332 increases axially. The ferrule 233 defines an opening 2333 communicating with the receiving hole 2331. The fixing ends 2311 of the two receiving members 231 are fixed together, and the sleeves 2315 of the two receiving members 231 receive the ferrule 233 cooperatively. The fixing portion 2319 of the sleeve 2315 abuts one end of the ferrule 233, to prevent the ferrule 233 detaching from the sleeve 2315.

In use, the receptacle 23 interconnects two optical fiber connectors 21, one optical fiber connectors 21 is received in the receiving member 231 from the inserting end 2313, and the guiding portion 2143 of the protecting member 214 passes into the sleeve 2315. The protecting member 214 is substantially coaxial with the ferrule 233. The protecting member 214 slides axially compressed by the ferrule 233, thus the optical fiber 301 in the protecting member 214 can protrude out of the protecting member 214 and extend into the receiving hole 2331, being guided by a side surface of the guiding slot 2332. The hooks 2318 latch with the latching protrusions 2118 of the housing 211, to fix the optical fiber connector 21 in the receptacle 23. The other optical fiber connector 21 is fixed in the other receiving member 231 in the same manner, thus the optical fibers 301 of the two optical fiber connectors 21 contact each other in the ferrule 233. Air in the receiving hole 2331 can be released through the opening 2333 of the ferrule 233, thus the two optical fibers 301 can contact tightly, and the optical signals may be transmitted between the two optical fibers 301.

The receptacle 23 includes the ferrule 233 therein, the optical fibers 301 contact each other in the ferrule 233, and the protecting members 214 are used for protecting the optical fibers 301 therein, therefore, the ferrule 233 is precise enough for securing the connection between the optical fibers 301, and the protecting member 214 may be made of plastic or other materials with ordinary precision, thereby decreasing the manufacture cost.

It should be noted that, the receptacle 23 may include only one optical fiber connector 21 and an receiving member 231 having a shortened ferrule 233 accordingly. The receiving member 231 may be mounted on an electronic device for receiving the optical fiber connector 21, and the optical signals may be transmitted from the optical fiber connector 21 to the electronic device.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An optical fiber connector comprising:
  a holder;
  a housing fixed on the holder;
  a clamping member for clamping an optical cable having an optical fiber, the clamping member comprising a base portion, a post formed on the base portion, the clamping member defining a bore therein for the cable passing through, the post defining a fixing hole communicating with the bore of the clamping member, and the post forming at least one elastic resisting tab adjacent to the fixing hole;
  a tube sleeved on the post and compressing the at least one elastic resisting tab for holding the cable in the post;
  a protecting member positioned in the housing, the protecting member defining a bore for the optical fiber of the optical cable moveably passing through;
  a first elastic member, an end of the first elastic member resisting the protecting member, and the other end of the first elastic member resisting the clamping member, to urge the protecting member to partly protrude out of the housing; and
  a second elastic member sleeved on the post of the clamping member, wherein the holder defines a first receiving chamber to receive the base portion of the clamping member and a second receiving chamber to receive the post of the clamping member, the holder forms a shoulder dividing the first and second receiving chambers, the post forms a stopping flange abutting the shoulder, an end of the second elastic member resisting the base portion of the clamping member, and the other end of the second elastic member resisting the shoulder of the holder, thus to fix the clamping member in the holder.

2. The optical fiber connector of claim 1, wherein the protecting member is made of plastic.

3. The optical fiber connector of claim 1, wherein the holder forms a contact protrusion, and the housing defines a latching hole engaging with the contact protrusion for fixing the holder on the housing.

4. The optical fiber connector of claim 1, wherein the housing forms a limiting flange, and the protecting member forms a limiting portion abutting the limiting flange, preventing the protecting member detaching from the housing.

5. An optical fiber connecting device, comprising:
at least one optical fiber connector; and
a receptacle receiving the optical fiber connector;
wherein the optical fiber connector comprises a holder, a housing fixed on the holder, a clamping member for clamping an optical cable having an optical fiber, a protecting member positioned in the housing, the protecting member defines a bore for the optical fiber of the optical cable moveably passing through and a first elastic member, a first end of the first elastic member resists the protecting member, a second end of the first elastic member resists the clamping member, to urge the protecting member partly protruding out of the housing; the receptacle comprises at least one receiving member, a sleeve in the receiving member and a ferrule in the sleeve, the ferrule defines a receiving hole corresponding to the bore of the protecting member, the ferrule abuts the protecting member, thereby compressing the first elastic member, and allowing the optical fiber extending in the receiving hole of the ferrule.

6. The optical fiber connecting device of claim 5, wherein the protecting member is made of plastic.

7. The optical fiber connecting device of claim 5, wherein the ferrule defines an opening communicating with the receiving hole of the ferrule.

8. The optical fiber connecting device of claim 5, wherein the holder forms a contact protrusion, and the housing defines a latching hole engaging with the contact protrusion for fixing the holder on the housing.

9. The optical fiber connecting device of claim 5, wherein the clamping member comprises a base portion, a post formed on the base portion, the clamping member defines a bore therein for the cable passing through, the post defines a fixing hole communicating with the bore of the clamping member, and the post forms at least one elastic resisting tab adjacent to the fixing hole, the optical fiber connector further comprises a tube sleeved on the post, and the tube compresses the resisting tab for holding the cable in the post.

10. The optical fiber connecting device of claim 9, wherein the holder defines a first receiving chamber receiving the base portion of the clamping member and a second receiving chamber receiving the post of the clamping member, the holder forms a shoulder dividing the first and the second receiving chamber, the post forms a stopping flange abutting the shoulder, and the optical fiber connector further comprises a second elastic member sleeved on the post, an end of the second elastic member resists the base portion of the clamping member, and the other end of the second elastic member resists the shoulder of the holder, thus to fix the clamping member in the holder.

11. The optical fiber connecting device of claim 10, wherein the housing forms a limiting flange, and the protecting member form a limiting portion abutting the limiting flange, preventing the protecting member detaching from the housing.

12. An optical fiber connector comprising:
a holder;
a housing fixed on the holder;
a clamping member for clamping an optical cable having an optical fiber;
a protecting member positioned in the housing, the protecting member defining a bore for the optical fiber of the optical cable moveably passing through; and
a first elastic member, an end of the first elastic member resisting the protecting member, and the other end of the first elastic member resisting the clamping member, to urge the protecting member to partly protrude out of the housing, wherein the housing forms a limiting flange, and the protecting member forms a limiting portion abutting the limiting flange, preventing the protecting member detaching from the housing.

* * * * *